March 15, 1966   JUN NISHIDAI   3,240,957
CAPACITOR POTENTIAL DEVICE
Filed March 27, 1963
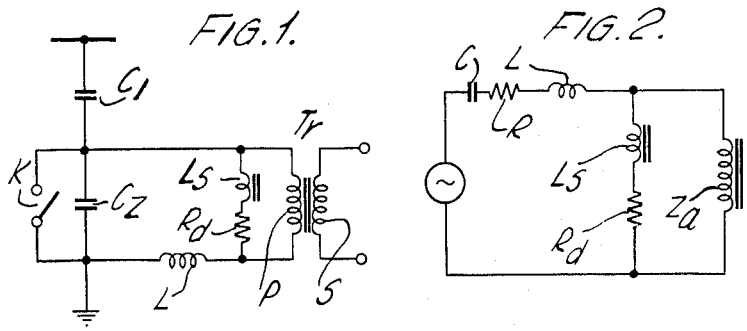
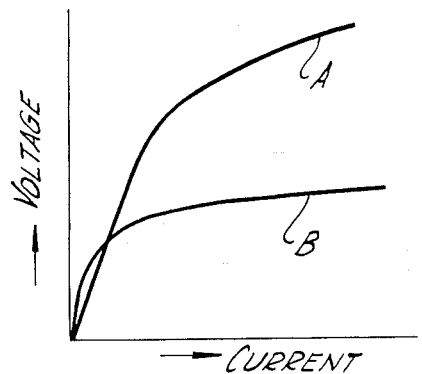
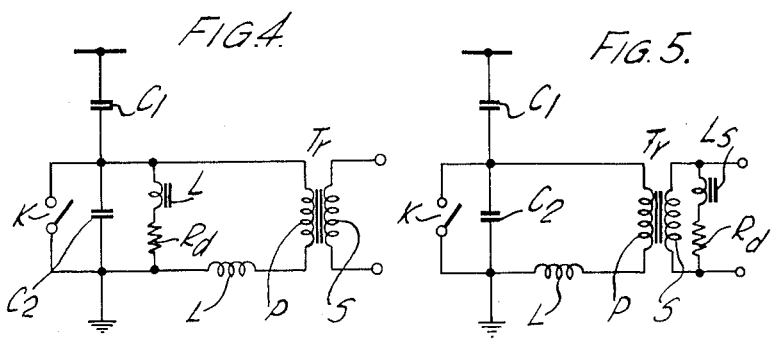
INVENTOR: JUN NISHIDAI
ATTORNEYS:
Reynolds & Christensen

United States Patent Office 3,240,957
Patented Mar. 15, 1966

3,240,957
CAPACITOR POTENTIAL DEVICE
Jun Nishidai, Ukyo-ku, Kyoto, Japan, assignor to Nissin Electric Co., Ltd., Ukyo-ku, Kyoto, Japan, a corporation of Japan
Filed Mar. 27, 1963, Ser. No. 268,367
Claims priority, application Japan, Apr. 1, 1962, 37/13,095
5 Claims. (Cl. 307—105)

This invention relates to a capacitor potential device and, more particularly, to a capacitor potential device provided with means for preventing occurrence of subharmonic oscillation.

In a capacitor potential device inserted in an electric system, when a short circuit condition on the secondary side of the device has been cleared or when the system voltage fluctuates, subharmonic oscillation is caused to occur. This is because the auxiliary transformer included in the capacitor potential device has an iron core, and the nonlinearity of the exciting inductance thereof together with the existence of capacitors causes ferroresonance to be produced. This extraordinary phenomenon causes a flow of overcurrent through the capacitor potential device and a resultant extraordinary rise in voltage at various terminals of the system, accompanied by undesired results.

Many methods have been proposed to suppress such subharmonic oscillations. One is to connect a damping resistor across the primary or secondary of the auxiliary transformer. Such resistance, however, makes a considerably heavy fixed burden on the capacitor potential device under normal operation. This causes not only a serious disadvantage that the secondary burden to be connected to the capacitor potential device is necessarily limited, but also deterioration in the accuracy of the device. Another method for suppression of subharmonics is to connect across the secondary of the auxiliary transformer a parallel-resonant circuit which is resonant at the fundamental frequency, and which is so designed as to present a high impedance to the fundamental frequency and a low impedance to subharmonic frequencies. This arrangement, however, has its own disadvantage that in addition to the existing elements, a capacitor and an inductor need be provided, and that the resonant circuit still has a higher impedance with respect to subharmonics than is permissible.

It is well known that subharmonics are caused by the nonlinearity of the exciting inductance of the auxiliary transformer due to saturation of its iron core.

Accordingly, the primary object of the invention is to provide a capacitor potential device provided with very simple circuit means for preventing occurrence of subharmonics. The circuit means comprises: a saturation reactor which has such characteristics that it is saturated before the core of the auxiliary transformer is saturated; and a damping resistor connected in series with the reactor. In accordance with the invention, the series-connected reactor and resistor are placed, as viewed from the side of the shunt capacitor of the capacitor potential device, at such a position as to shunt the auxiliary transformer. The reactor has such characteristics that its impedance becomes far lower than the exciting impedance of the auxiliary transformer after the reactor has been saturated.

Now suppose there happen to be produced some transient phenomena responsible for occurrence of subharmonics. Then, the iron core of the auxiliary transformer will tend to be saturated. However, before saturation of the iron of the auxiliary transformer is effected, the iron of the reactor will have been saturated, so that in the discharge circuit of the capacitors, the auxiliary transformer will be shunted by the lower impedance of the reactor, through which the discharge current from the capacitors will flow and be suppressed by the damping resistor. Thus, the iron of the auxiliary transformer will never be saturated; consequently, subharmonics will be completely prevented from occurring.

Other objects, features and advantages of the invention will be more apparent from the following detailed description of preferred embodiments of the invention with reference to the accompanying drawings, wherein:

FIGURE 1 is a schematic diagram of a capacitor potential device embodying the invention;

FIGURE 2 is the equivalent circuit for FIGURE 1;

FIGURE 3 shows characteristic curves of the auxiliary transformer and saturation reactor used in the embodiments of the invention;

FIGURE 4 is a schematic diagram of another embodiment of the invention; and

FIGURE 5 is a schematic diagram of still another embodiment of the invention.

Referring first to FIGURE 1, there is shown a shunt capacitor $C_2$ connected, on the one hand, to a main capacitor $C_1$ and, on the other, to a resonant reactor L and the primary P of an auxiliary transformer Tr. The secondary S of this transformer is to be connected to a burden such as measuring instruments or relays. Across capacitor $C_2$ is connected a grounding switch K. So far, the structure of the capacitor potential device of the invention has nothing unknown in the prior art. What distinguishes the circuit arrangement of the invention from those well known is the provision of a series combination of a saturation reactor Ls and a damping resistor Rd. In FIGURE 1, the series circuit is connected across the primary P of auxiliary transformer Tr. The equivalent circuit for this is shown in FIGURE 2, wherein C is the sum of the capacitances of capacitors $C_1$ and $C_2$; Lo and R are the sum of the inductances of reactor L and transformer Tr and the sum of the resistances thereof, respectively; and Zo is the exciting impedance of transformer Tr.

In accordance with the invention, the saturation reactor Ls has such characteristics that its saturation curve rises rapidly until saturation is soon reached. Cold rolled silicon steel sheet having a high permeability is suitable for core material of the saturation reactor. FIGURE 3 shows the saturation characteristic curves of auxiliary transformer Tr and saturation reactor Ls plotted as A and B, respectively. For the purpose of the invention, it is required that after the reactor has been saturated, its impedance be sufficiently lower than the exciting impedance of the auxiliary transformer. Thus, when the reactor has been saturated, equivalently it shunts the exciting impedance of transformer Tr. It may be permitted that before saturation of the reactor, its impedance is also lower than the exciting impedance of the transformer. However, this causes deterioration in the characteristics of the potential device. Therefore, it is preferable that before saturation of the reactor, its impedance is sufficiently higher than the exciting impedance of the transformer, as shown in FIGURE 3.

Damping resistor Rd has a resistance value required to suppress the resonant current due to ferroresonance. It is preferable that the resistance value is 1 to 10 times as much as $$\frac{1}{W(C_1+C_2)}$$

wherein $C_1$ and $C_2$ are the capacitances of capacitors $C_1$ and $C_2$, respectively, and W is the fundamental angular frequency. This range of resistance is suitable for suppressing subharmonic oscillation of order ⅓ or ⅕.

Instead of providing a series-connected damping resistor such as resistor R$d$, reactor L$s$ may be so designed and constructed that its winding has the required damping resistance value.

In operation, so long as the capacitor potential device of the invention operates normally, the impedance of saturation reactor L$s$ is sufficiently higher than the exciting impedance of auxiliary transformer T$r$, so that the existence of reactor L$s$ does not interfere with the normal operation of the potential device. When such electrical shocks as are likely to produce subharmonics are given to the potential device, the core of the auxiliary transformer is affected in such a manner as to be saturated. However, prior to saturation of the auxiliary transformer, the saturation reactor is saturated, and its impedance becomes sufficiently lower than the exciting impedance of the auxiliary transformer; consequently, subharmonic resonant current will not flow through the circuit constituting the higher impedance of the auxiliary transformer, but through the circuit constituting the lower impedance of the saturation reactor, only to be suppressed by the damping resistor. Thus, the core of the transformer will never be saturated; and occurrence of subharmonics can be completely prevented.

For the purpose of the invention, it is required that the series circuit of reactor L$s$ and resistor R$d$ be placed at such a position relative to the shunt capacitor C$_2$ as to be shunted across transformer T$r$. Such requirement may also be met by the modes of connection shown in FIGURES 4 and 5. In FIGURE 4, the series circuit of saturation reactor L$s$ and damping resistor R$d$ is shown connected across shunt capacitor C$_2$. Subharmonic resonant current will not pass through auxiliary transformer T$r$, but through the series circuit so as to be suppressed by the damping resistor. In FIGURE 5, the series circuit of saturation reactor L$s$ and damping resistor R$d$ is connected across the secondary S of auxiliary transformer T$r$. The equivalent circuit for this arrangement is quite the same as that shown in FIGURE 2. The series circuit is shunted across the exciting impedance of auxiliary transformer T$r$, so that subharmonics will not pass through the higher impedance of the transformer, but through the lower impedance of the series circuit, only to be suppressed by damping resistor R$d$.

It is thus seen that in accordance with the invention, since the iron core of the auxiliary transformer is never brought into a saturated state, the core may be made to have a maximum flux density higher than otherwise. This means that the capacitor potential device of the invention may be made smaller and more compact than those in the prior art. It is also seen that the invention has succeeded in eliminating all the defects encountered in the prior art.

It should be recognized that the embodiments disclosed herein are merely representative, and that modifications and changes may be made without departing from the true scope and spirit of the invention.

What is claimed is:

1. Capacitor potential device comprising, a main capacitor, a shunt capacitor, an auxiliary transformer having a core and primary and secondary windings, circuit means connecting said shunt capacitor to said primary winding, a resonant reactor inserted in said circuit means, a saturation reactor which is saturated prior to the saturation of said auxiliary transformer, and which, after saturated, presents a sufficiently lower impedance than the exciting impedance of said auxiliary transformer, and series circuit means including said saturation reactor and having a resistance value sufficient to suppress subharmonic resonant current, said last-mentioned series circuit means being placed at such a position, as viewed from said shunt capacitor, as to be shunted across said auxiliary transformer.

2. Capacitor potential device of claim 1, wherein said last-mentioned series circuit is connected across said primary winding of said auxiliary transformer.

3. Capacitor potential device of claim 1, wherein said last-mentioned series circuit is connected across said shunt capacitor.

4. Capacitor potential device of claim 1, wherein said last-mentioned series circuit is connected across said secondary winding of said auxiliary transformer.

5. Capacitor potential device of claim 1, wherein said last-mentioned series circuit comprising said saturation reactor and a damping resistor having a resistance value sufficient to suppress subharmonic resonant current.

References Cited by the Examiner

UNITED STATES PATENTS

| | | | |
|---|---|---|---|
| 2,573,596 | 10/1951 | Offner | 323—78 X |
| 3,106,651 | 10/1963 | Hagglund et al. | 307—105 |
| 3,111,619 | 11/1963 | Gertsch | 323—61 |

OTHER REFERENCES

German printed application No. 1,020,731, December 1957.

LLOYD McCOLLUM, *Primary Examiner.*

W. E. RAY, *Assistant Examiner.*